United States Patent Office 2,982,760
Patented May 2, 1961

2,982,760

PROCESS FOR SPINNING VINYL RESIN SOLUTION

Domenico Maragliano and Enrico Cernia, Milan, Italy, assignors to Soc. Polymer, Industrie Chimiche, Milan, Italy No Drawing. Filed Aug. 12, 1954, Ser. No. 449,504

Claims priority, application Italy Sept. 29, 1953

10 Claims. (Cl. 260—85.5)

In order to obtain synthetic fibers from vinyl resins and particularly from polyacrylonitrile, the polymers are dissolved in suitable solvents; the solutions obtained are spun by conventional dry or wet processes. Strong concentration and simultaneously absolute homogeneity must be displayed by the solutions employed, since inhomogeneous solutions do not pass, or pass with great difficulty, through filters and spinnerets. However it is difficult to obtain homogeneous solutions.

In general, some difficulties are encountered when dissolving vinyl polymers in their solvents, particularly when polyacrylonitrile is to be dissolved in dimethylformamide. When the polymer is introduced in the solvent (or "viceversa"), part of the polymer dissolves to form rapidly highly viscous solutions. Subsequent dissolution of the remaining polymer thus becomes very difficult, since the latter tends to remain in the solution formed in the state of a gel. Even by vigorous stirring it is not possible to eliminate this inconvenience completely; the average composition of the spinning solution is altered and heterogeneous solutions are obtained, which afford the troubles occurring by spinning.

Furthermore, owing to the considerable viscosity attained already in the first stage of dissolution air and other gases remain occluded in the polymer and hardly can evolve during stirring. In order to eliminate said occluded gases, a long storage of the solutions is needed, said solutions having to be kept at the relatively high temperatures whereto less high viscosity values correspond. However, the stay of the solutions at such temperatures induces degradation and discolouration.

In order to overcome said drawbacks it has been suggested to perform the dispersing operation in the presence either of a non-solvent, such as for instance either, or in the presence of sulfur dioxide. The introduction of substances lowering the viscosity of the solutions, such as for instance aldehydes or substances forming same, has been suggested to promote degassing. However, the advantages offered by said methods are quite modest; furthermore, the presence in the suspension of extraneous substances, whose removal in some cases is necessary when the solution has been obtained, may give rise to the formation of small gas bubbles or even, if the substance introduced is e.g. sulfur dioxide, to an attack of the apparatus material.

It has now been found surprisingly, and this is an object of this invention, that by a short preliminary heat of the polymer at 50 to 200° C., the latter is given the property of being dispersed in the spinning solvent in the cold, giving rise to homogeneous, very fluid, suspensions free from crumbles which can be degassed within few seconds' time. Upon heating said suspensions in the spinning solvent at temperatures in the range of from 30° to 150° C., depending on the cases, solutions are obtained, perfectly free from gels, gas bubbles and crumbs even at very high concentrations.

This behaviour is probably due to a partial decomposition occurring upon the surface of the polymer particles to form products whose solubility in the solvent is lower than that of the unmodified polymer.

In the case of polyvinyl chloride said degradation products may be e.g. long chain polymer formed with development of hydrogen chloride according to the scheme:

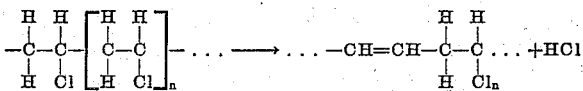

whereas upon degradation of acrylonitrile products of similar structure may be formed with the development of hydrogen cyanide.

In both cases the structure of the degradation products obtained would be such as to promote cross-linkage formation, whose presence has a negative influence on the solubility of said products in the respective solvents.

When the dispersion of said polymers in the respective solvents is performed in the cold swelling occurs but to minimum extent. Proper polymer suspensions in the solvent can be thus obtained, the fluidity of which permits sufficient stirring and consequently dispersion with highest uniformity. As a second step, to obtain the solution it is now necessary, that the surface of the uniformly suspended particles becomes free from that layer of degraded molecules with which the molecules of the unaltered polymer are enveloped and which preserves them from swelling during the dispersion stage. To do this, the suspension is heated at suitable temperature to dissolve the surface layer of degradation products. The underlying molecules; once free from their protective layer and brought thereby to contact the solvent, dissolve without difficulty as they are in the state of homogeneous dispersion.

The degraded portion of polymer is extremely small and of such order of magnitude as to exert no influence upon the characteristics of the whole mass of the treated polymer, said characteristics remaining identical with those of untreated polymer. As a matter of fact, fibers or films obtained therefrom present the same physical, mechanical and chemical properties as those obtained from normal polymers.

Said degraded portion however is so small as to be practically unmeasurable. The total amount of hydrogen cyanide developing upon treatment of sufficient duration as to provide the wanted effect, is so small that its determination with silver nitrate solution is impossible. Silver nitrate solution does not become turbid and turns only slightly opalescent.

Moreover, it is known that polyvinyl chloride sets free HCl under the action of heat. Because of these facts as well as in view of our discovery that polymers treated in the herein disclosed manner result in low viscosity dispersions that are resistant to attack by solvents in the cold, although they will readily dissolve upon heating, the following two hypotheses may be postulated: (a) that, due to the heat-treatment, the entire polymer undergoes a slight degradation, accompanied by the formation of cross-linkages between the individual macromolecules which increases the resistance of the material toward solvent attack at room temperature; or (b), as we are more inclined to think, upon heating in the herein disclosed manner, because of the greater facility of liberating decomposition products (hydrocyanic acid or hydrochloric acid), the degradation is restricted to the surface of the granules. Without intending of binding us in any way, the first hypothesis is to us the less probable, primarily in view of the extremely small amounts of hydrocyanic or hydrochloric acid that are liberated in this procedure.

According to this presumption, to obtain a polymer which is homogeneously dispersable but not swelling in the cold, degradation to great extent will be unnecessary, but only such a treatment will be required as will form a very thin layer of degraded product on the surface of the single polymer particles; said layer will suffice to provide the wanted effect even if its thickness is in the order of magnitude of one monomer molecule.

Over conventional processes this method provides in the first place the advantage that a homogeneous dispersion may be obtained having a much lower viscosity than the one obtained through the dispersion of normal polymers and not hindering the mechanical stirring of the mixture. For instance, viscosity values in the order of 10–20 poise are obtained according to this invention, as compared with more than 100 poise in dispersions of preliminarily untreated polymer.

The advantage of essential importance resulting from this low viscosity is that the mixture can be easily stirred and solutions can be obtained quite free from gels and crumbs which represent as is known a serious obstacle in the subsequent operations of filtration and spinning of the solutions.

Another advantage of considerable importance is that air and other gases emulsified during the stirring of the mixture are very readily removed. Thus that long heating time is avoided, which may be injurious to the dissolved polymer but which is necessary in order to remove small gas bubbles contained in the solutions obtained from normal polymers, viz. in polymers not treated according to this invention.

The heat pre-treatment will be preferably carried out directly on the wet polymerization product; however it may of course be performed on the contrary after drying, and it may be a dry or wet heat-treatment.

Some examples are given hereinafter without limitation.

*Example 1*

25 parts of an acrylonitrile polymer are introduced into a rotary horizontal cylinder, which is passed through by a nitrogen stream heated at 120° C., and are kept therein during 20 minutes. After heating, the polymer will be dispersed in 75 parts of dimethylformamide. The dispersion obtained has a viscosity of 25 poise. Subsequently it is heated up to 80° C. and a homogeneous solution is obtained, free from gas bubbles and quite free from gels and crumbs. Upon spinning this solution a fiber is obtained which after stretching displays, a breaking load of 5 g./den. and an elongation of 14–18%.

*Example 2*

25 parts of an acrylonitrile polymer are dispersed in 250 parts of water, in a vessel provided with a stirrer. In the moving suspension a steam current at 110° C. is bubbled. After 30 minutes of treatment the polymer will be separated from the aqueous portion by filtration and then dried. After drying, the dispersion in dimethylformamide and the subsequent operations are carried out under the same conditions as in Example 1, to obtain analogous results.

*Example 3*

A mixture of 30 parts of a copolymer of acrylonitrile and vinylpyridine (ratio 90:10) and of 300 parts of water is centrifuged to separate the solid from the liquid. A steam jet under 3 atm. pressure is passed for 15 minutes upon the copolymer filter cake while still wet. After treatment, the polymer is dried and dispersed at room temperature in 100 parts of dimethylformamide. The viscosity of the dispersion is 30 poise. Afterwards it is heated up to 70° C., to obtain a quite homogeneous solution, free from crumbs, gels and gas occlusions. The fiber obtained upon spinning the solution has after stretching a tensile strength of 4.2 g./den. and an elongation of 10–12%.

*Example 4*

30 parts of polyvinyl chloride are heated in a water bath at 100° C. for 10 minutes. After drying, the polymer is dispersed at room temperature in 70 parts of a mixture of carbon disulfide and acetone. The dispersion obtained has a viscosity of 50 poise; it is then heated up to 35° C. under simultaneous stirring. A uniform solution is obtained which is free from gels, crumbs and gas bubbles. The yarn obtained by spinning the solution, displays after stretching mechanical characteristics analogous to those of the yarn obtained from an untreated polymer, namely a tensile strength of 3.0–3.3 g./den. as well as an elongation of 12–14%.

*Example 5*

25 parts of acrylonitrile polymer are dispersed in 200 parts of ethylene glycol wherein the polymer is quite insoluble. The dispersion is gradually brought, up to 120° C., while still agitating, and so kept at this temperature for about 20 minutes. Then the dispersion is cooled down to room temperature and the polymer is filtered, washed with distilled water and dried as usually. After drying the dispersion in dimethylformamide and the subsequent operations are carried out under the same conditions of Example 1, to obtain analogous results.

*Example 6*

30 parts of a copolymer of 85% of acrylonitrile and 15% ethylacrylate are dispersed in water with vigorous stirring. The dispersion is heated up to a temperature of 90° C., at which it is kept for 50 minutes. The dispersion is then cooled down to room temperature and the polymer is filtered, washed with distilled water and dried as usually. After drying, the dispersion is dimethylformamide and the subsequent operations are performed under same conditions as in Example 1, to obtain analogous results.

We claim:

1. A process for obtaining a synthetic fiber, comprising subjecting particles of a polymer of the group consisting of polyvinylchloride, polyacrylonitrile, copolymer of acrylonitrile and vinyl pyridine, and copolymer of acrylonitrile and ethyl acrylate to a heat treatment at a temperature between about 50 to 200° C. for a period of about ten minutes to two hours, in a medium consisting of a member of the group consisting of water, steam, inert organic liquid diluents and inert gas, but plasticizers and chemically reactive materials being absent, dispersing the separated polymer product, after drying where water or steam has been used in the heat treatment, the dispersing being in the cold in an organic solvent thereof, then heating the dispersion at 30 to 150° C. to dissolve the surface layer of degradation products formed in said heat treatment and then the inner layer, to obtain a homogeneous spinning solution substantially free from gas bubbles and from gels and crumbs, and spinning said solution.

2. A process for obtaining a synthetic fiber, comprising subjecting particles of polyacrylonitrile to a heat treatment at a temperature between about 50° to 200° C. for a period of about ten minutes to two hours, in a medium consisting of a member of the group consisting of water, steam, inert organic liquid diluents and inert gas, but plasticizers and chemically reactive materials being absent, dispersing the polymer product, after drying, where water or steam has been used, the dispersing being in the cold in dimethylformamide, heating the dispersion at 30 to 150° C. to dissolve the surface layer of degradation products formed in said heat treatment and then the inner layer, to obtain a homogeneous spinning solution substantially free from gas bubbles and from gels and crumbs, and spinning said solution.

3. A process for obtaining a synthetic fiber, comprising subjecting particles of polyacrylonitrile to a heat treatment at a temperature between about 50 to 200° C. for a period of about ten minutes to two hours, while dispersed in water, but plasticizers and chemically reactive materials being absent, drying, dispersing the dried product in the cold in dimethylformamide, heating the dispersion at 30 to 150° C. to dissolve the surface layer of degradation products formed in said heat treatment and then the inner layer, to obtain a homogeneous spinning solution substantially free from gas bubbles and from gels and crumbs, and spinning said solution.

4. The process described in claim 3, the heat treatment being at about 110° C. for about 30 minutes.

5. A process for obtaining a synthetic fiber, comprising subjecting particles of polyvinylchloride to a heat treatment at a temperature between about 50 to 200° C. for a period of about ten minutes to two hours, in a medium consisting of a member of the group consisting of water, steam, inert organic liquid diluents, and inert gas, but plasticizers and chemically reactive materials being absent, dispersing the product, after drying, where water or steam has been used, the dispersing being in the cold in a mixture of carbon disulfide and acetone, heating the dispersion at 30 to 150° C. to dissolve the surface layer of degradation products formed in said heat treatment and then the inner layer, to obtain a homogeneous spinning solution substantially free from gas bubbles and from gels and crumbs, and spinning said solution.

6. The process defined in claim 2, the heat treatment being in a stream of nitrogen at about 120° C.

7. The process defined in claim 1, the medium consisting of water.

8. A process for obtaining a synthetic fiber, comprising subjecting particles of the copolymer of acrylonitrile and ethyl acrylate to a heat teatment at a temperature between about 50 to 200° C. for a period of about ten minutes to two hours, while dispersed in water, but plasticizers and chemically reactive materials being absent, drying, dispersing the dried product in the cold in dimethylformamide, heating the dispersion at 30 to 150° C. to dissolve the surface layer of degradation products formed in said heat treatment and then the inner layer, to obtain a homogeneous spinning solution substantially free from gas bubbles and from gels and crumbs, and spinning said solution.

9. The process defined in claim 1, the medium being a steam jet imposed upon a cake of the polymer.

10. The process defined in claim 1, the polymer being acrylonitrile polymer, the medium being ethylene glycol, the organic solvent being dimethylformamide.

References Cited in the file of this patent

UNITED STATES PATENTS

| | | |
|---|---|---|
| 2,373,347 | Schoenfeld | Apr. 10, 1945 |
| 2,445,042 | Silverman | July 13, 1948 |
| 2,482,038 | Temple | Sept. 13, 1949 |
| 2,674,593 | Condo et al | Apr. 6, 1954 |
| 2,773,856 | Meyer et al. | Dec. 11, 1956 |

UNITED STATES PATENT OFFICE
CERTIFICATE OF CORRECTION

Patent No. 2,982,760　　　　　　　　　　　　　　May 2, 1961

Domenico Maragliano et al.

It is hereby certified that error appears in the above numbered patent requiring correction and that the said Letters Patent should read as corrected below.

In the grant, lines 2 and 3, for "assignors to Soc. Polymer, Industrie Chimiche, of Milan, Italy," read -- assignors to Polymer-Industrie Chimiche S.p.A., of Milan, Italy, --; line 12, for "Soc. Polymer, Industrie Chimiche, its successors" read -- Polymer-Industrie Chimiche S.p.A., its successors --; in the heading to the printed specification, lines 5 and 6, for "assignors to Soc. Polymer, Industrie Chimiche, Milan, Italy" read -- assignors to Polymer-Industrie Chimiche S.p.A., Milan, Italy --.

Signed and sealed this 3rd day of October 1961.

(SEAL)
Attest:

ERNEST W. SWIDER
Attesting Officer

DAVID L. LADD
Commissioner of Patents
USCOMM-DC